(12) United States Patent
Rueger

(10) Patent No.: US 8,729,787 B2
(45) Date of Patent: May 20, 2014

(54) FIELD EMISSION DEVICES AND METHODS FOR MAKING THE SAME

(75) Inventor: Neal R. Rueger, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1488 days.

(21) Appl. No.: 11/640,701

(22) Filed: Dec. 18, 2006

(65) Prior Publication Data

US 2008/0143230 A1     Jun. 19, 2008

(51) Int. Cl.
*H01J 21/00*     (2006.01)

(52) U.S. Cl.
USPC .......................................... 313/497; 313/495

(58) Field of Classification Search
USPC .................................. 313/495–497
See application file for complete search history.

(56) References Cited

U.S. PATENT DOCUMENTS

| | | | |
|---|---|---|---|
| 6,250,984 B1 * | 6/2001 | Jin et al. .......................... | 445/51 |
| 6,307,323 B1 | 10/2001 | Song et al. | |
| 6,426,590 B1 * | 7/2002 | Chung et al. .................. | 313/496 |
| RE38,561 E | 8/2004 | Keesmann et al. | |
| 6,957,993 B2 | 10/2005 | Jiang et al. | |
| 6,987,027 B2 | 1/2006 | Jin | |
| 7,045,108 B2 | 5/2006 | Jiang et al. | |
| 7,054,064 B2 | 5/2006 | Jiang et al. | |
| 7,081,385 B2 | 7/2006 | Farnworth et al. | |
| 7,090,555 B2 | 8/2006 | Lee et al. | |
| 7,122,967 B2 | 10/2006 | Jo et al. | |
| 7,125,534 B1 | 10/2006 | Smalley et al. | |
| 7,134,931 B2 | 11/2006 | Chen et al. | |
| 7,135,159 B2 | 11/2006 | Shaffer et al. | |
| 2001/0006232 A1 * | 7/2001 | Choi et al. ...................... | 257/10 |
| 2003/0127965 A1 * | 7/2003 | Uemura et al. ............... | 313/495 |
| 2004/0007955 A1 | 1/2004 | Yaniv et al. | |
| 2005/0184675 A1 | 8/2005 | Zoulkarneev et al. | |
| 2005/0242707 A1 * | 11/2005 | Hwang ......................... | 313/497 |

OTHER PUBLICATIONS

Wei, Yang, et al., "Efficient fabrication of field electron emitters from the multiwalled carbon nanotube yarns" Appl. Phys. Lett., vol. 89, 063101-1-063101-3 (2006).

* cited by examiner

*Primary Examiner* — Mariceli Santiago
*Assistant Examiner* — Christopher Raabe
(74) *Attorney, Agent, or Firm* — Brooks, Cameron & Huebsch, PLLC

(57) ABSTRACT

The present disclosure includes field emission device embodiments. The present disclosure also includes method embodiments for forming field emitting devices. One device embodiment includes a housing defining an interior space including a lower portion and an upper portion, a cathode positioned in the lower portion of the housing, a elongate nanostructure coupled to the cathode, an anode positioned in the upper portion of the housing, and a control grid positioned between the elongate nanostructure and the anode to control electron flow between the anode and the elongate nanostructure.

27 Claims, 6 Drawing Sheets

FIELD EMISSION DEVICES AND METHODS FOR MAKING THE SAME

TECHNICAL FIELD

The present disclosure relates generally to field emission devices and, in particular, the present disclosure relates to field emission devices using nanotubes.

BACKGROUND

Within the communications industry gridded vacuum tube amplifiers have been proposed for use in a number of fields of application. Electron valve devices, including microwave vacuum tube devices in the form of power amplifiers, for example, can be utilized as components of microwave systems including telecommunications, radar, electronic warfare, and navigational systems, among others. In some instances, semiconductor microwave amplifiers do not provide the power capabilities utilized by some microwave systems. However, in some instances, vacuum tube amplifiers can provide microwave power which is higher by orders of magnitude. The higher power levels can be achieved, for example, because electrons can travel faster in vacuum with fewer collisions than in semiconductor material. These higher speeds can, in some instances, permit larger structures with the same transit time which, in turn, can produce greater power output.

Other electron valve devices can include, for example, triodes, tetrodes, pentodes, klystrodes, klystrons, traveling wave tubes, cross-field amplifiers, and gyrotrons. In addition, the devices can have various sizes such that they can be used in various applications, including, for example, small devices for use in audio signal amplification. Such devices can contain a cathode structure including a source of electrons, an interaction structure (e.g., grid or gate), and an output structure (e.g., anode).

In such devices, the source of electrons can be a thermionic emission cathode. The emission cathode can be formed, for example, of tungsten that can be coated with barium or barium oxide, or mixed with thorium oxide. Thermionic emission cathodes can be heated to temperatures around one thousand (1000) degrees Celsius (° C.) to produce sufficient thermionic electron emission current (e.g., on the order of amperes per square centimeter). The heating of thermionic cathodes to such temperatures can reduce or limit the lifetime of the cathodes, introduce warm-up delays, require auxiliary equipment for cooling, and/or interfere with modulation of emission, for example, in gridded tubes. In addition, as vacuum tube size decreases, high temperature thermionic emission cathodes can present increase heat and reliability problems.

DETAILED DESCRIPTION

Figure 1:
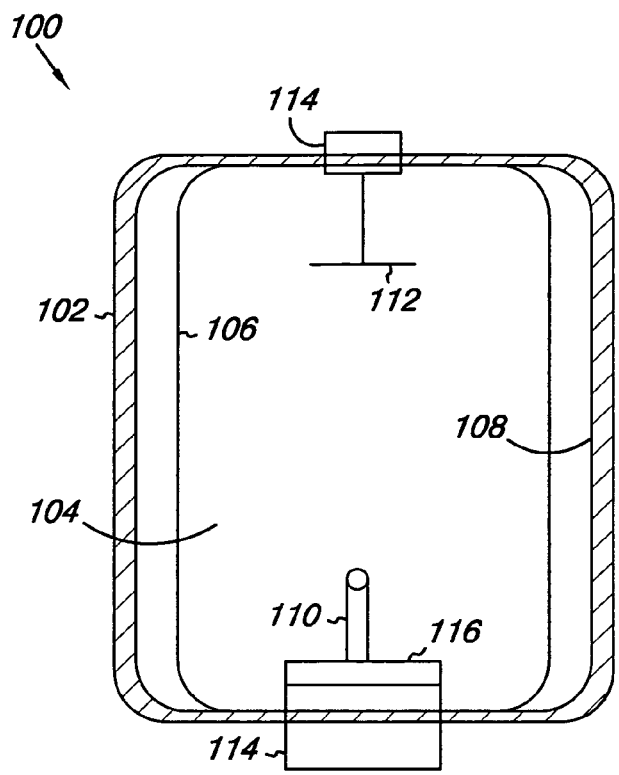
FIG. 1 illustrates an embodiment of a diode according to the present disclosure.

An elongate nanostructure can have properties that make it potentially useful in a wide variety of applications in nanotechnology, electronics, optics, and other fields of science. Depending on the elongate nanostructure, as discussed herein, the elongate nanostructure can be metallic, semi-metallic, and/or other such materials, making them electrically conductive or semiconductive. Such elongate nanostructures can exhibit electrical conductivity as high as copper and/or thermal conductivity as high as diamond.

Elongate nanostructures have many properties that make them useful components of electrical circuits, including nanoscale dimensions and/or electrical conductivity, among others. By using elongate nanostructures in an electron tube, as discussed herein, the nanoscale electron tubes can be provided in circuit designs to be used in logic, memory, imager, and amplifier chip designs, among others.

Embodiments of the present disclosure include device embodiments such as field emitters, amplifiers, diodes, and triodes, where the devices include an elongate nanostructure, for example, a carbon nanotube. The present disclosure also includes method embodiments such as those for forming field emitters, diodes, and triodes, including forming-elongate nanostructures.

For example, a field emission device embodiment according to the present disclosure can include a housing defining an interior space including a lower portion and an upper portion, a cathode positioned in the lower portion of the housing and an anode positioned in the upper portion of the housing. In such embodiments, an elongate nanostructure can be electrically coupled to the cathode and a control grid can be positioned between the elongate nanostructure and the anode to control electron flow between the anode and the elongate nanostructure.

In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

FIG. 1 illustrates an embodiment of a diode according to the present disclosure. A diode can be used as a device that can restrict the direction of movement of charge carriers. For example, a diode can allow an electric current to flow in one direction, but block it in the opposite direction. As illustrated in FIG. 1, an embodiment of a diode 100 can include a housing 102 defining an interior space 104. The housing 102 can be formed of one or more materials, including glass, ceramic, or metal, among others.

In some embodiments, the housing 102 can be maintained in a vacuum state. By maintaining the inside of the housing 102 in a vacuum state, gas atoms remaining in the housing 102 can be prevented from ionizing at operating voltages and conducting electricity between elements inside the housing 102 in an uncontrolled manner. In some embodiments, the housing 102 can be evacuated, for example, to a pressure of at least $5\times10^{-3}$ Pascal (Pa).

To reduce gases in the housing 102 from remaining in a free state, the housing can be constructed with small troughs filled with materials that oxidize quickly, for example, barium. In such embodiments, while the housing 102 is being evacuated, the elements inside the housing 102 can be heated (e.g., by radio frequency (RF) induction heating) to extract remaining gases from the trough material. In some embodiments, the troughs may not be heated.

The housing 102 can then be sealed and the trough can be heated, to cause the trough material to evaporate, absorbing/reacting with any residual gases. In addition, if a metallic trough material is used, the trough material can, for example, leave a metallic deposit on the inside of the housing 102 where it can continue to absorb gas molecules that leak into the housing 102.

As discussed further herein, in some embodiments, the diode 100 can be formed where the housing 102 has nanometer scale dimensions, for example, with a diameter in a range of three (3) to thirty (30) nanometers. In such embodiments, the flow of electrons is less likely to be interrupted by other gases in the housing 102 since the device dimensions are small. As such, in such embodiments, the housing 102 can be maintained at an atmospheric pressure.

In some embodiments, the housing 102 can include a dielectric 106 on an interior surface 108 of the housing 102. The dielectric 106 can be a dielectric layer on a portion of the interior surface 108 or a dielectric shell covering the entire interior surface 108 of the housing 102. In various embodiments, the dielectric 106 can be formed of aluminum oxide and/or silicon oxide, among other suitable materials.

The diode 100 can also include an elongate nanostructure 110 and an anode positioned in the interior space 104 of the housing 102. The anode 112 and elongate nanostructure 110 can be attached to leads 114 which pass through the housing, for example, via an air tight seal.

Embodiments utilizing elongate nanostructures are beneficial because the elongate shape of the nanostructure can be used to direct electrons produced generally in the direction of elongation. In such embodiments, the elongate nanostructures can thereby direct the electrons toward an anode.

Accordingly, as used herein, an "elongate nanostructure" can be any suitable elongate shape that can be used to direct electrons produced generally in the direction of elongation. Such elongate nanostructures include, for example, nanotubes, nanorods, and nanoneedles. As used herein, a "nanotube" refers to a nanometer scale wire-like structure. In some embodiments, a elongate nanostructure 110 can be a carbon nanotube 110.

Although the present disclosure may describe embodiments including carbon nanotubes, it is to be understood that elongate nanostructures, including nanotubes, nanorods, or nanoneedles formed from materials other than carbon can be utilized in embodiments of the present disclosure. For example, elongate nanostructures can also be formed of vanadium oxide, manganese oxide, boron nitride, and silicon, among other suitable materials.

In embodiments including nanotubes, the nanotubes can be used as field emitters. Further, in embodiments including nanorods as well as embodiments including nanoneedles, the nanorods and/or nanoneedles can be used as field emitters. The field electron emission, for example, can be facilitated by applying an electric field to a surface of the elongate nanostructure to reduce the energy barrier thickness of the elongate nanostructure, such that electrons can be ejected from the surface of the elongate nanostructure to become free electrons according to quantum-mechanical tunneling effect. Since the free electrons are generated by the electric field, a heat source does not have to be used, hence, the field electron emission elongate nanostructure can sometimes be referred to as a cold cathode.

The elongate nanostructure 110 can emit electrons when a negative charge is applied to the elongate nanostructure 110. When the anode 112 is positively charged, it will electrostatically attract the emitted electrons.

In some embodiments, the elongate nanostructure 110 can be coupled to a cathode 116. In such embodiments, the negative charge can be applied to the leads 114 connected to the cathode 116, while the anode 112 is positively charged, to cause the elongate nanostructure 110 to emit electrons in the direction of the anode 112. In addition, the cathode 116 and anode 112 can be formed of a number of different conductive materials including, but not limited to, tin, aluminum, copper, gold, and/or silver, among others.

Also, in some embodiments, the anode 112 can have a phosphor layer or a phosphor region. In such embodiments, this can be utilized to create a field emission display with light characteristics of a liquid crystal display (LCD) and/or brightness and self emission advantages of a cathode ray tube (CRT) display.

As discussed herein, the elongate nanostructure 110 illustrated with respect to the diode 100 can be a nanorod, nanoneedle, or a nanotube (e.g., including a single-walled nanotube, a multi-walled nanotube, or a nanotube yarn formed from a number of nanotubes).

Figure 2:
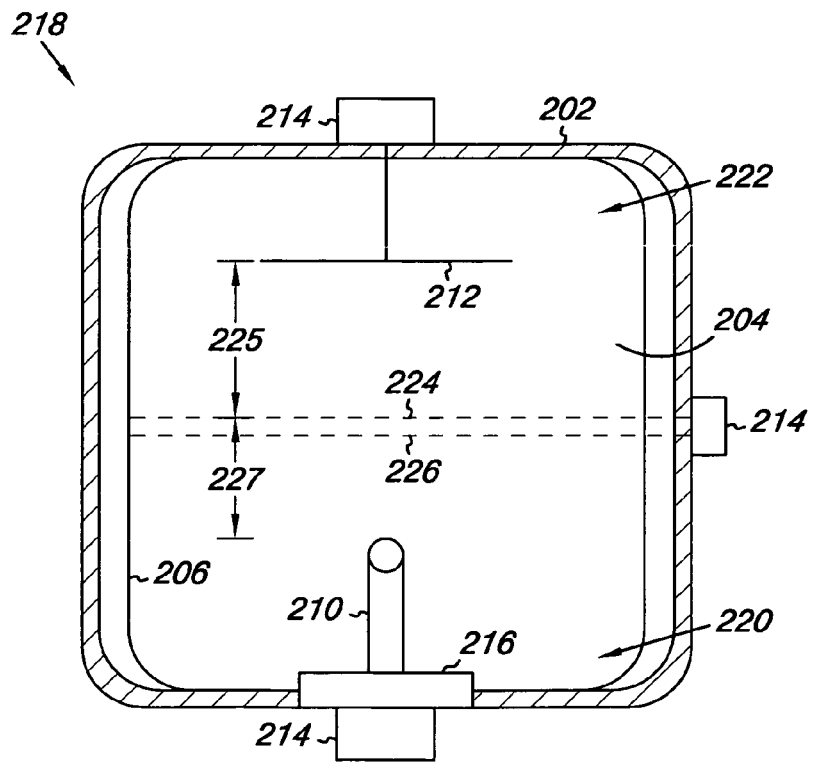
FIG. 2 illustrates an embodiment of a triode according to the present disclosure.

FIG. 2 illustrates an embodiment of a triode according to the present disclosure. In the embodiment of FIG. 2, the triode 218 can be an example of a field emission device, and can be used as a transistor, an amplifier, or a switching device, among others in analog circuits, transistors can be used in amplifiers, and linear regulated power supplies. Transistors can also be used in digital circuits where they can function as electronic switches. Digital circuits can include logic gates, random access memory (RAM), microprocessors, and digital signal processors (DSPs).

In some embodiments, the triode 218 can also be used as an amplifier. An amplifier is a device that uses a small amount of energy to control a larger amount of energy. In addition, in some embodiments, the triode 218 can be used as a switch. A switch is a device for changing the course (or flow) of a circuit.

As illustrated in FIG. 2, the triode 218 includes a housing 202, as discussed herein, defining an interior space 204 including a lower portion 220 and an upper portion 222. In some embodiments, the housing 202 can be maintained, for example, in a state such as in a vacuum state or at an atmospheric pressure state, as discussed herein.

Also included in the triode 218 of the embodiment of FIG. 2 is a cathode 216, an elongate nanostructure 210 coupled to the cathode 216, an anode 212, leads 214 connected to both, and a control grid 224. In various embodiments, the cathode 216 can be positioned in the lower portion 220 of the interior space 204 of the housing 202 and the anode 212 can be positioned in the upper portion 222 of the interior space 204 of the housing 202. In addition, the cathode 216 and the anode 212 can be formed of a conductive material, as discussed herein.

As shown in the embodiment illustrated in FIG. 2, the control grid 224 can be positioned between the elongate nanostructure 210 and the anode 212 to control electron flow between the anode 212 and the elongate nanostructure 210 when a negative potential is applied to the cathode 216, as discussed herein. As illustrated in FIG. 2, the control grid 224 can be positioned between the elongate nanostructure 210 and the anode 212 inside the housing 202. In some embodiments, the control grid 224 can be formed of a ring-like structure and be positioned outside the housing 202, between the elongate nanostructure 210 and the anode 212.

In some embodiments, the control grid 224 can have a mesh configuration, among other suitable forms. For example, embodiments can also include a hole matrix control grid 224, a control grid 224 in the shape of a ring, or a control grid 224 with a zig-zag shape. The control grid 224 can, in some embodiments, be formed of a wire that is not prone to emitting electrons itself. In another example, in some embodiments, the control grid 224 can be a molybdenum alloy with gold plating.

In some embodiments, the control grid 224 can be a frame grid, where a wire can be wound onto a frame. Such frame grid embodiments can, in some instances, allow the holding of very close tolerances, so the control grid 224 can be placed closer to the nanotube 210 as compared to a control grid 224 formed of a wire.

As discussed herein, the triode 218 can be used as an amplifier. In such embodiments, by placing the control grid 224 closer to the elongate nanostructure 210 relative to the anode 212, a greater amplification can result, in some instances. Such embodiments may result in a higher transconductance, which is a measure of the anode 212 current change versus control grid 224 voltage change. A higher transconductance can be desirable since the noise figure of an amplifier is inversely proportional to its transconductance, therefore a higher transconductance generally infers a lower noise figure. The noise figure is a measure of how much noise is introduced in the amplification process. It is measured by the peak output voltage produced by the amplifier when no signal is applied to the control grid 224.

As such, in some embodiments, the control grid 224 can be positioned between the elongate nanostructure 210 and the anode 212 in a position closer to the elongate nanostructure 210 as compared to the anode 212. Alternatively, the control grid 224 can be positioned between the elongate nanostructure 210 and the anode 212 in a position equal to or closer to the anode 212 as compared to the elongate nanostructure 210.

In addition, in some embodiments, the control grid 224 can be positioned in the housing 202 or outside the housing 202 such that a space 225 is provided between the control grid 224 and the anode 212. The space 225 can be predetermined and can be independent of the length of the elongate nanostructure 210 and/or the housing 202. Alternatively, the control grid 224 can be positioned in the housing 202 or outside the housing 202 such that a second space 227 is provided between the control grid and the elongate nanostructure 210. Similarly to the space 225, the second space 227 can be predetermined and independent of the housing 202 size.

As discussed herein, the triode 218 can be used in many applications. For example, a triode 218 can be used in radio transmitters and receivers. In some embodiments, the triode 218 can include a second control grid 226, turning the triode 218 into a tetrode. This structure can be beneficial in applications where parasitic anode 212 to control grid 224 capacitance may be present. When a positive potential slightly lower than the potential applied to the control grid 224 is applied to the second control grid 226, the second control grid 226 can be bypassed to ground with a capacitor. This arrangement can decouple the anode 212 and the control grid 224, reducing or preventing oscillation in some instances.

The second control grid 226 can be positioned closer to the elongate nanostructure 210 relative the control grid 224, equal to, or closer to the anode 212 relative the control grid 224. The second control grid 226 can be used to modify the current flowing between the cathode 216 and the anode 212. In some embodiments, the second control grid 226 can be positioned outside the housing 202 closer to the elongate nanostructure 210 relative the control grid 224, equal to, or closer to the anode 212 relative the control grid 224. In some embodiments, the second control grid 226 can be positioned outside the housing 202, while the control grid 224 can be positioned in the housing 202, or vice versa. In addition, embodiments of the present disclosure are not limited to two control grids, but instead may contain three control grids or more.

As discussed herein, the triode 218 illustrated in the embodiment of FIG. 2, includes an elongate nanostructure 210 coupled to the cathode 216. In addition, in some embodiments, the triode 218 can also include a number of elongate nanostructure 210 coupled to the cathode 216.

Figure 3:
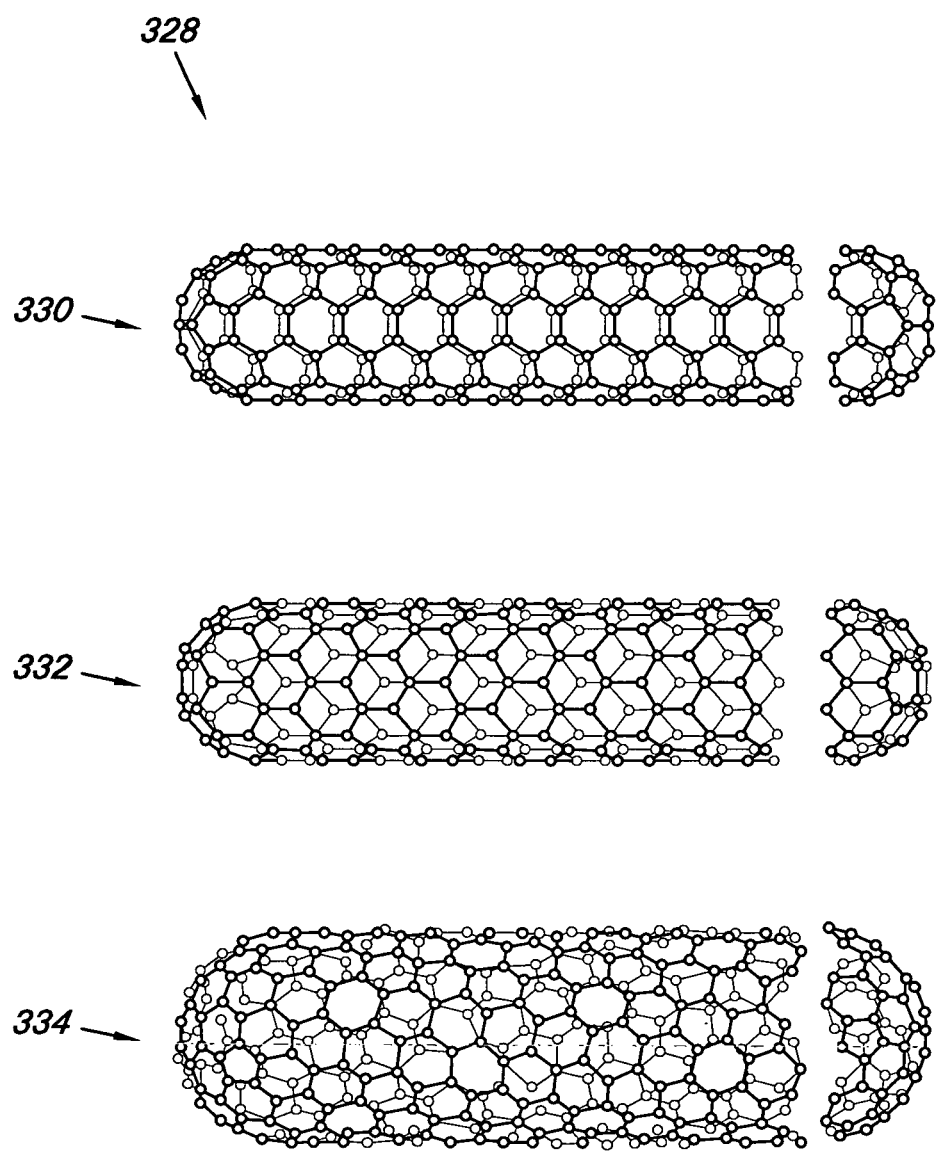
FIG. 3 illustrates a single-walled carbon nanotube in three different configurations according to embodiments of the present disclosure.

FIG. 3 illustrates a single-walled nanotube in three different configurations according to the present disclosure. The structure of a single-walled nanotube 328 can be conceptualized, for example, by wrapping a one-atom-thick layer of graphite called graphene into a seamless cylinder.

As illustrated in the embodiments of FIG. 3, a single-walled nanotube 328 can be provided having one of a number of structures, such as an armchair configuration 330, a zig-zag configuration 332, or a chiral configuration 334. As is known in the art, the terms "arm chair," "zig-zag," and "chiral" refer to the arrangement of hexagons around the circumference of the nanotube. In some embodiments, a single-walled nanotube 328 can have a diameter in the range of one (1) nanometer (nm) to one and one-half (1.5) nm, for example.

Figure 4:
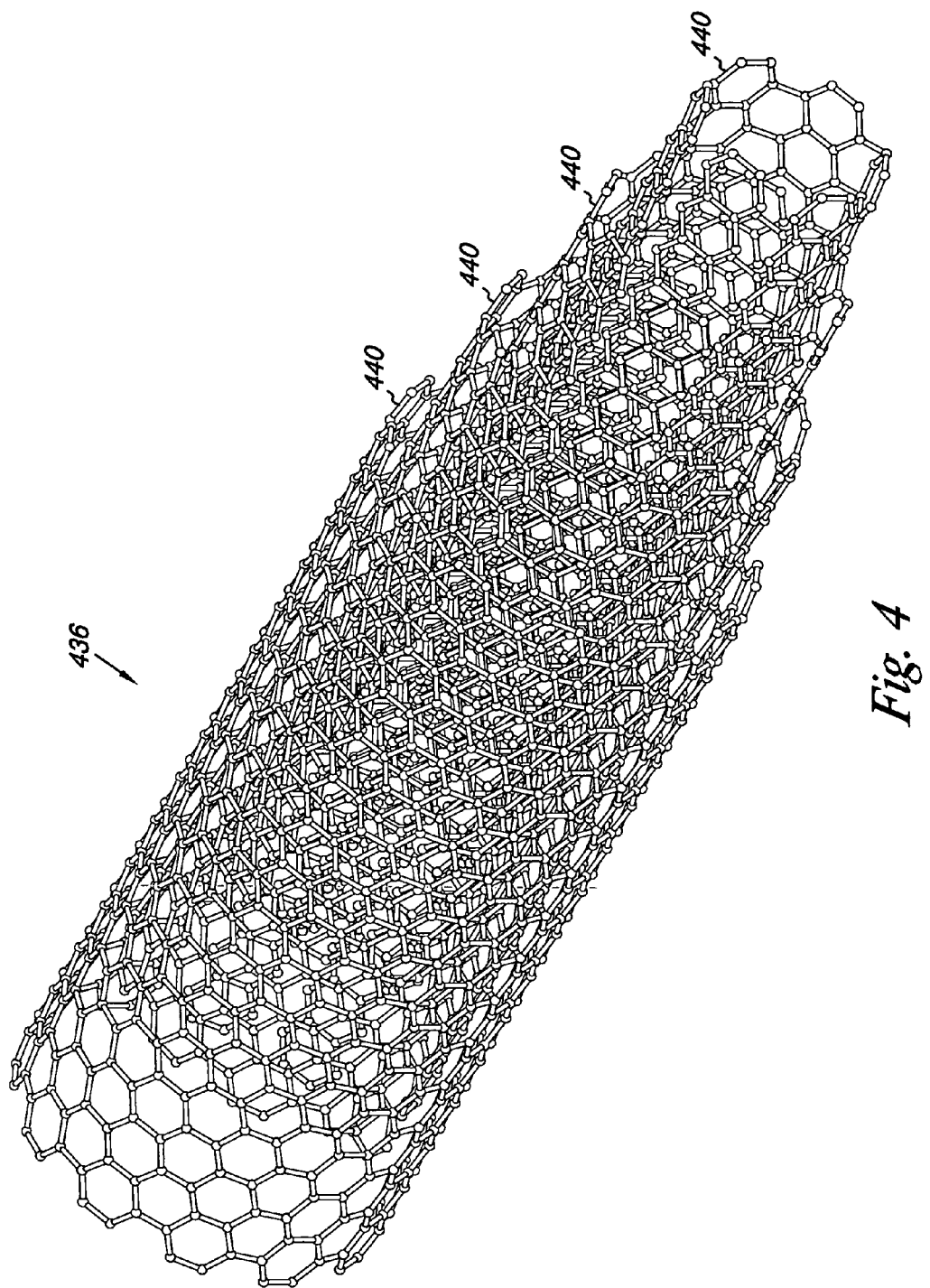
FIG. 4 illustrates an embodiment of a multi-walled carbon nanotube according to embodiments of the present disclosure.

FIG. 4 illustrates an embodiment of a multi-walled nanotube according to embodiments of the present disclosure. Multi-walled nanotubes include multiple layers of material (e.g., graphite) rolled in on themselves to form a tube shape. FIG. 4 illustrates the multi-walled nanotube 436 where sheets of graphite are arranged in concentric cylinders 440 (e.g., in the Russian Doll type structure).

Figures 5A, 5B:
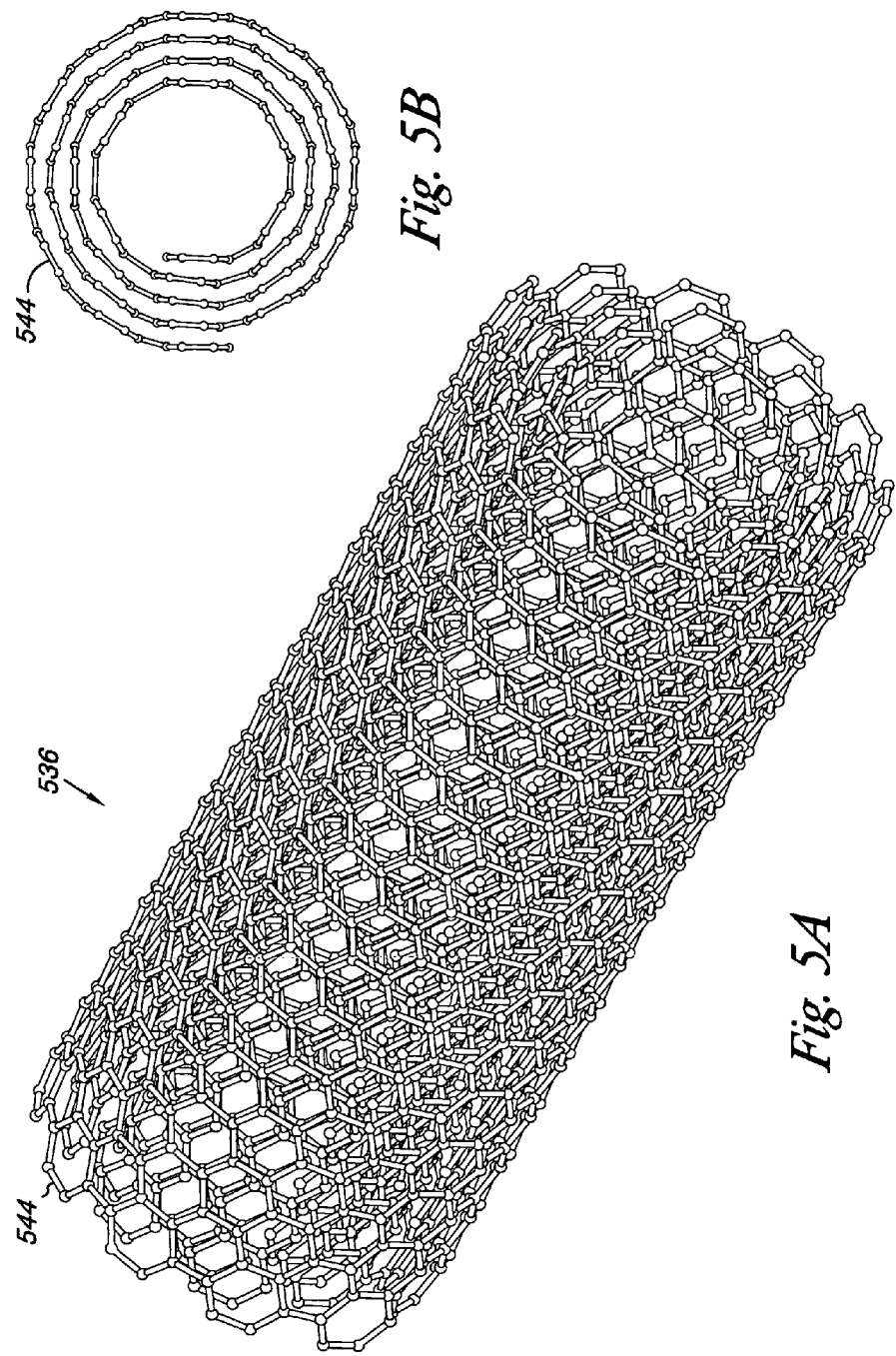
FIG. 5A illustrates a perspective view and 5B illustrates an end view of an embodiment of a multi-walled carbon nanotube according to the present disclosure.

FIG. 5A illustrates a perspective view and 5B illustrates an end view of an embodiment of a multi-walled nanotube according to the present disclosure. As shown in the embodiments illustrated in FIGS. 5A and 5B, a multi-walled nanotube 536 can have a structure (e.g., in the Parchment type structure) where a single sheet of graphite 544 is rolled in around itself, resembling a scroll of parchment or a rolled up newspaper.

Both the single-walled nanotubes and the multi-walled nanotubes, as well as nanorods and nanoneedles can be produced using several techniques including, arc discharge, laser ablation, and chemical vapor deposition, among others. In addition, different methods can be used among these techniques. Although methods of producing single-walled and multi-walled nanotubes as well as nanorods and nanoneedles are discussed herein, embodiments of the present disclosure can include other variations in techniques.

An arc discharge type method can create elongate nanostructures through arc-vaporization of two carbon rods placed end to end, separated, for example, by approximately one (1) millimeter (mm), in an enclosure that can be filled with an inert gas (e.g., helium, argon) at pressures in the range of fifty (50) to seven hundred (700) millibars (mbar). By applying a direct current in a range of fifty (50) to one hundred (100) ampere (A) driven by approximately twenty (20) volts, a high temperature discharge can be created between the two electrodes. In such techniques, the discharge can vaporize one of the carbon rods and form a small rod shaped deposit on the other rod. However, producing elongate nanostructures in high yield, in such embodiments, can depend on the uniformity of the plasma arc and/or the temperature of the deposit formed on the carbon electrode.

In some embodiments, different diameter distributions of elongate nanostructures can be produced depending, for example, on the mixture of helium and argon. This can be accomplished since these mixtures have different diffusion coefficients and thermal conductivities, which can affect the speed with which the carbon and catalyst molecules diffuse and cool. In addition, in some techniques, nanorods, nanoneedles, single walled nanotubes, or multi-walled nanotubes can selectively be grown.

For example, in techniques where single walled nanotubes are desired, one carbon electrode can be doped with a catalyst (e.g., a metal catalyst). The catalyst can be selected, for examples, from materials such as iron, cobalt, nickel, yttrium, or molybdenum. In such techniques, an arc discharge method can produce single-walled nanotubes having diameters, for instance, in the range of 0.6 to 1.4 nm.

In techniques where multi-walled nanotubes are desired, the catalyst may not be used in the arc discharge method. Multi-walled nanotubes can thereby be produced having inner diameters in the range of one (1) to three (3) nm and an outer diameter of, for example, approximately ten (10) nm.

Elongate nanostructures can also be produced using a laser ablation method. In some techniques, a continuous laser can be used to vaporize a graphite target in an oven at a temperature of, for example, approximately one thousand two hundred (1200) degrees Celsius (° C.). In various techniques, the laser can be pulsed, however, in a pulsed laser method, a higher light intensity is sometimes used (e.g., one hundred (100) kilowatt per squared centimeter ($kW/cm^2$) compared with twelve (12) $kW/cm^2$).

In some techniques, the oven can be filled with helium or argon gas in order to keep the pressure inside the oven at approximately sixty (60) kilopascal (kPa). As the graphite is being vaporized, a vapor plume can form, then expand and cool rapidly. As the vaporized graphite cools, small carbon molecules and atoms can condense to form larger clusters.

In techniques where a pure graphite target is used, multi-walled nanotubes can be formed. Alternatively, in embodiments where a mixture of graphite with cobalt, nickel, iron, and/or yttrium is used, uniform single-walled nanotubes can be formed.

In some techniques, the laser ablation method forms single-walled nanotubes with a length, for instance, in the range of five (5) to twenty (20) microns and a diameter in a range of one (1) to two (2) nm.

In addition to laser ablation and arc discharge; elongate nanostructures can be produced using chemical vapor deposition (CVD), as discussed herein. CVD techniques can be achieved by putting a carbon source into a gas phase and using a gas phase carbon source as an energy source, such as a plasma or a resistively heated coil, to transfer energy to a gaseous carbon molecule. The gas phase carbon source can include methane, carbon monoxide, and/or acetylene, among others. The gas phase carbon source can be used to "crack" the molecule into reactive atomic carbon which then diffuses toward a layer of material where it will bind. In embodiments of the present disclosure, where a field emission device can be formed using the elongate nanostructure formed from the various techniques described herein, the layer of material can be a cathode, as described herein. In some techniques, the cathode can be heated and coated with a catalyst (e.g., nickel, iron, and/or cobalt).

In addition, CVD methods can be used, for example, to achieve positional control on a nanometer scale as well as control over the elongate nanostructure diameter and the growth rate of the nanotubes. Further, the appropriate catalyst can be used to grow single rather than multi-walled nanotubes.

In some techniques, single-walled nanotubes can be produced by CVD with diameters, for instance, ranging from 0.6 to four (4) nm. In addition, multi-walled nanotubes can be produced with diameters, for instance, ranging from ten (10) to two hundred forty (240) nm.

As discussed herein, in some embodiments, the nanotube used in embodiments of the present disclosure can be a nanotube yarn. As used herein, a "nanotube yarn" refers to any number of nanotubes in a group pulled from a nanotube array.

A nanotube yarn can, for example, be formed in two steps. In such embodiments, a nanotube array can be formed and a nanotube yarn can be pulled out from the array. In various embodiments, the nanotube array can be formed by CVD, or other suitable techniques.

With respect to using a CVD technique to form the array, first a cathode is provided on which the array is to be formed. The cathode can be a silicon wafer, which, for instance, can be approximately five (5) cm in diameter and three hundred fifty (350) micrometers (μm) thick. Other suitable cathode materials can be used in various CVD techniques. In addition, other sizes for the cathode can be used.

In such techniques, a thermal-oxidized layer can be formed on the cathode. The thermal-oxidized layer can, for instance, be five hundred (500) to nine hundred (900) nm thick. In some instances, the thermal-oxidized layer can have a flat and smooth surface to enable growth of a large-scale nanotube array.

Once the thermal-oxidized layer is applied to the cathode, an iron film can be deposited on the cathode by, for example, electron beam evaporation, and can be annealed in air (e.g., at a temperature in the range of approximately three hundred (300) to four hundred (400)° C. for approximately ten (10) hours) to form a ferrous oxide film. In some techniques, the ferrous oxide film can have a thickness, for instance, in the range of four (4) to ten (10) nm. The ferrous oxide film can be reduced to pure iron, for example, by a reaction with hydrogen ($H_2$) and/or ammonia ($NH_3$). In such techniques, the pure iron can then be used as a catalyst.

In some techniques, the cathode can then be diced into a number of rectangular pieces. Each piece can be put into a boat (e.g., a quartz boat), which can be subsequently inserted into a furnace (e.g., a one-inch quartz tube furnace). The furnace can be heated, for example, to six hundred fifty (650) to seven hundred (700)° C. (e.g., in flowing argon gas). In some techniques, a mixture of thirty (30) standard cubic centimeters per minute (sccm) acetylene and three hundred (300) sccm argon gas can be supplied into the tube furnace for five (5) to thirty (30) minutes. In such techniques, the acetylene can function as a carbon containing gas, and the argon can function as a protecting gas. By supplying a carbon containing gas, nanotubes can form on the cathode where a cathode surface contains a catalyst. The furnace can then be cooled down to room temperature. In some embodiments, a super-aligned array of nanotubes can be formed on the cathode, with nanotubes being compactly bundled up together.

Figure 6:
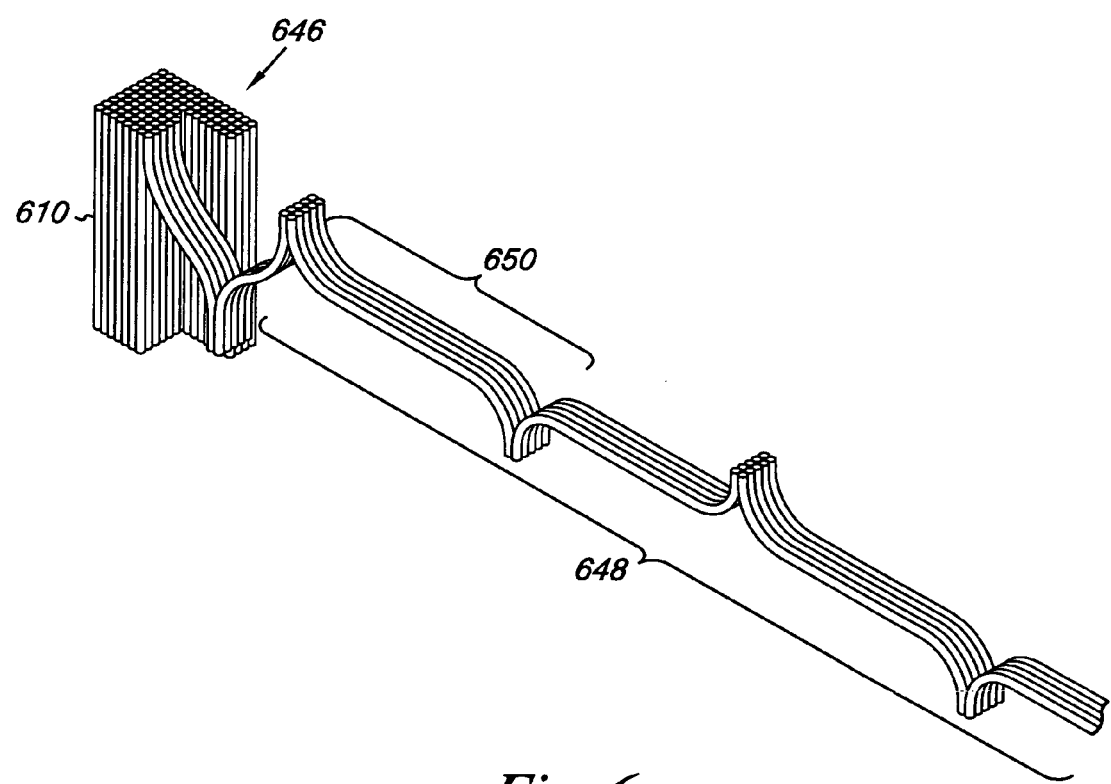
FIG. 6 illustrates a method embodiment of pulling nanotubes from a nanotube array to form a nanotube yarn according to the present disclosure.

FIG. 6 illustrates a method embodiment of pulling nanotubes 610 from a nanotube array 646 to form a nanotube yarn 648 which can be used as an elongate nanostructure with respect to various embodiments of the present disclosure. In some embodiments, a nanotube bundle 650 of the nanotube array 646 can be pulled by a tool, for example, a tweezers. As used herein, a "nanotube bundle" refers to any plurality of nanotubes formed in a contiguously adjacent group in the nanotube array.

In some embodiments, as a nanotube bundle 650 is drawn out, it can often pull out successive other nanotube bundles 650 joined end to end connected by, for example, van der Waals attractive force between ends of adjacent bundles 650. In such embodiments, the nanotube yarn 648 is formed from these bundles 650.

In some embodiments, a nanotube yarn 648 can be drawn out from super-aligned nanotube arrays 646. To increase the probability of producing a super-aligned nanotube array 646, the cathode surface, as discussed herein, can be substantially smooth and flat. Other factors that can increase the probability of producing a super-aligned nanotube array 646 include the growth rate can be relatively high, and the partial pressure of carbon containing gas can be relatively low, among others.

In some embodiments, by having a cathode surface that is smooth and flat, a higher density nanotube array 646 can be formed. Because the nanotubes 610 are packed closely together, the van der Waals attractive force between adjacent nanotubes 610 can be strong, which can enable the nanotubes 610 to be pulled out in linked bundles 650 from the nanotube array 646 to form the yarn 648. Therefore, in some embodiments, a non-porous silicon wafer or a silicon wafer with a thermal-oxidized film can be used as the cathode since it can give both a smooth and flat cathode surface.

In embodiments where the growth rate is high and the partial pressure of carbon containing gas is low, the nanotubes are more likely to be well graphitized, and the occurrence of deposits on outer surfaces of the nanotubes 610 can be decreased. With less outer surface deposits the van der Waals attractive force between the nanotubes 610 can be increased.

In some embodiments, to reduce or prevent the occurrence of deposits on outer surfaces of the nanotubes 610, the growth rate of the nanotubes 610 can be increased while the deposition rate of amorphous carbons is decreased. Since the growth rate of nanotubes 610 can be proportional to a difference between the furnace temperature and the local temperature of the catalyst, to increase the growth rate of the nanotubes 610, the difference in the temperature can, for example, be controlled to be at least fifty (50)° C.

In addition, since the deposition rate of amorphous carbons can be proportional to the partial pressure of carbon containing gas, the partial pressure of carbon containing gas can, for example, be controlled to not exceed 0.1. In some embodiments, the partial pressure of carbon containing gas can be controlled by adjusting the ratio of the flow rates of the carbon containing gas and the protecting gas.

In various embodiments, a combined width of the yarn 648 depends on the number of nanotube 610 threads in the yarn 648. In some embodiments, the combined width of the yarn 648 can be controlled by a size of the tip of the tool that is used to pull out the yarn 648. Thus, in such embodiments, the smaller the tip, the thinner the combined width of the yarn 648.

In addition, the force used to pull out the yarn 648 depends on the combined width of the yarn 648. For example, a force of 0.1 milliNewtons (mN) is needed to pull out a two hundred (200) μm wide yarn 648 from the nanotube array 646 in one embodiment. In some embodiments, the greater the combined width of the yarn 648, the greater the force that is used.

Also, a combined length of the yarn 648 depends on an area of the nanotube array 646. For example, it may be possible to draw out a ten (10) meter (m) long, two hundred (200) μm wide yarn 648 from a one hundred (100) μm high nanotube array 646 having an area of one (1) cubic centimeter ($cm^2$).

In some embodiments, to enhance the strength of the nanotube yarn 648, a nanotube yarn 648 can be pulled forward through droplets of ethanol, or other materials, which can cause a nanotube yarn 648 several centimeters wide to shrink into a tight fiber approximately tens of microns in diameter due to the increased surface tension. In addition, in some embodiments, the nanotube yarns 648 can also be made stronger with an additional heat treatment. For example, the nanotube yarns 648 treated with ethanol can be heated by a fifty-five (55) milliampere (mA) direct current for approximately five (5) hours under a vacuum of, for example, $5 \times 10^{-5}$ Pa.

As discussed herein, a number of different devices can be formed using an elongate nanostructure as a field emitter, including field emission devices such as diodes, triodes, transistors, switches, and amplifiers. In some embodiments, the size of the elongate nanostructure can be used to reduce the size of the device.

For example, a nanorod, nanoneedle, and/or a single-walled nanotube can be produced with a diameter, for instance, in the range of 0.6 to two (2) nm (i.e., depending on the method of growth), as discussed herein. In this example, a diode or a triode, (e.g., FIGS. 1 and 2) can be formed as a nanoscale electron tube with a diameter, for example, in the range of three (3) to ten (10) nm and a length of five (5) to thirty (30) microns.

In addition, in some embodiments, a nanorod, nanoneedle, and/or single-walled nanotube can be formed on a cathode with a diameter, for instance, in the range of one (1) nm to ten (10) nm. In this example, a housing can be formed around the elongate nanostructure with a diameter, for example, in the range of three (3) to fifteen (15) and a length of five (5) to thirty (30) microns.

Similarly, a nanorod, nanoneedle, and/or multi-walled nanotube can be produced with an outer diameter of, for instance, approximately ten (10) nm. In such embodiments, a diode or a triode, as described herein, can be formed as a nanoscale electron tube with a diameter, for instance, in the range of fifteen (15) to thirty (30) nm and a length of five (5) to fifty (50) microns.

In some embodiments, a multi-walled nanotube array can be formed on a cathode, as discussed herein, and positioned in a lower portion of a housing with an interior space. The array can be coupled to the cathode and positioned in an upper portion of the housing, in some instances opposite an anode, as discussed herein, to form a diode.

A control grid can be positioned between the nanotube array and the anode to form a triode, as discussed herein. In some embodiments, the multi-walled nanotube array can be a super-aligned nanotube array formed, for example, as discussed herein with respect to FIG. 6.

In such embodiments, the nanotube array can, for example, be formed on a circular cathode with a diameter of approximately three hundred (300) millimeters (mm) to produce a diode or a triode with a diameter, for instance, in the range of three hundred fifty (350) to four hundred (400) mm. Embodiments of the present disclosure are not limited to circular cathodes, but can include various other shapes including square, rectangular, oval, and/or pentagon, among others. In addition, in some embodiments, the nanotube array can be encapsulated with an oxide before the nanotube array is positioned in the housing, as discussed herein. In some embodiments, the nanotube array can be formed on a circular cathode with a diameter in the range of fifty (50) to five hundred (500)

mm, with a corresponding device diameter in the range of fifty five (55) to six hundred (600) mm.

A nanotube yarn, as described herein, can be used to form a diode or a triode. In some embodiments, a nanotube yarn can be formed, as discussed herein, and cut, for example, to a length in the range of one (1) to ten (10) mm and formed, for instance, with a diameter in a range of one-half (0.5) to 1.5 mm forming a fresh cross section where the nanotube yarn has been cut.

In some embodiments, the nanotube yarn can be positioned in a housing such that the fresh cross section is in a lower portion of a housing opposite a control grid and/or an anode in an upper portion of the housing. In addition, in various embodiments, the device can have a diameter in a range of one (1) mm to five (5) mm and a length in a range of two (2) to twenty (20) mm, among others.

Figure 7:
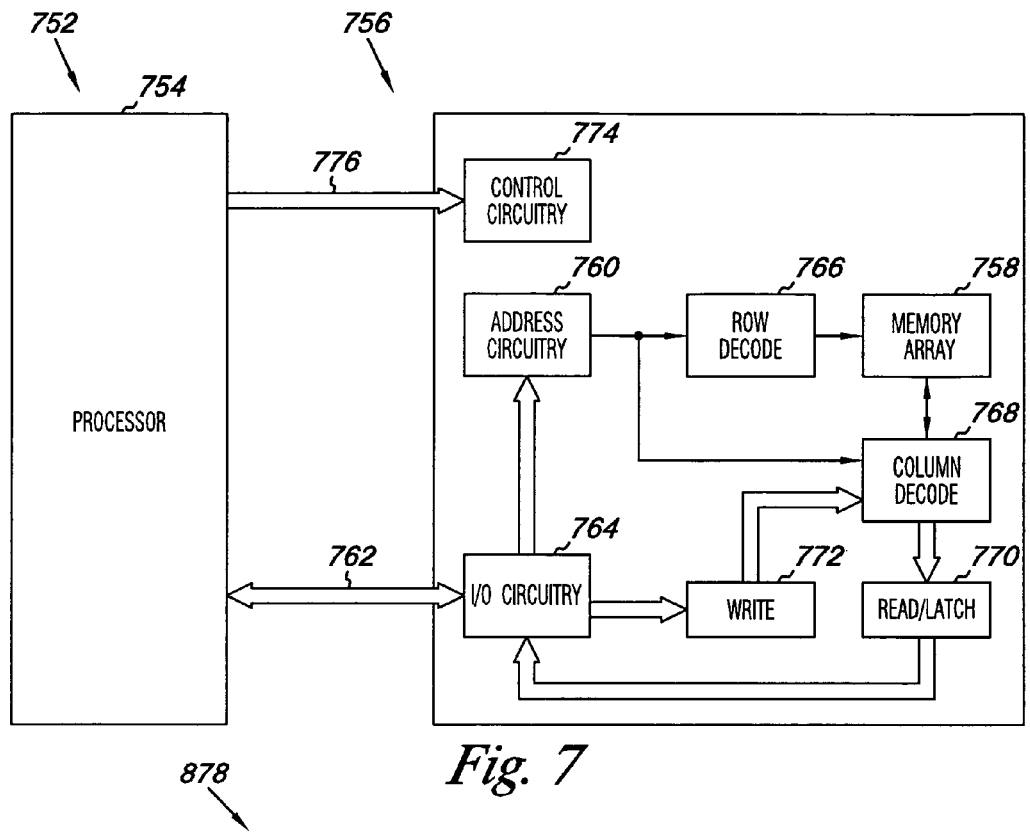
FIG. 7 is a block diagram of an electronic memory system utilizing at least one memory device incorporating a device in accordance with an embodiment of the present disclosure.

FIG. 7 is a functional block diagram of an electronic memory system having at least one memory device incorporating a device in accordance with an embodiment of the present disclosure. Memory system 752 includes a processor 754 associated with a non-volatile memory device 756 that includes a memory array 758 of non-volatile cells.

The memory system 752 can include separate circuits or the processor 754 and the memory device 756 can be on the same circuit. The processor 754 can be a microprocessor or some other type of controlling circuitry such as an application-specific integrated circuit (ASIC).

For clarity, the electronic memory system 752 has been simplified to focus on features with particular relevance to the present disclosure, and as such, another electronic memory system may have a number of other components. The memory device 756 includes an array of non-volatile memory cells 758 (e.g., floating gate flash memory cells with a NAND architecture).

The embodiment of FIG. 7 includes address circuitry 760 to latch address signals provided over I/O connections 762 through I/O circuitry 764. Address signals are received and decoded by a row decoder 766 and a column decoder 768 to access the memory array 758.

The memory array 758 of non-volatile cells can include non-volatile multilevel memory cells programmed according to embodiments described herein. In such embodiments, the memory device 756 can, for example, read data in the memory array 758 by sensing voltage and/or current changes in the memory array columns using sense/buffer circuitry that, in such embodiments, can be read/latch circuitry 770.

The read/latch circuitry 770 can be coupled to read and latch a row of data from the memory array 758. I/O circuitry 764 can be included for bi-directional data communication over the I/O connections 762 with the processor 754. Write circuitry 772 can be included to write data to the memory array 758.

Control circuitry 774 can be used to decode signals provided by control connections 776 from the processor 754. These signals can include chip signals, write enable signals, and address latch signals that are used to control the operations on the memory array 758, including data read, data write, and/or data erase operations.

In various embodiments, the control circuitry 774 can be responsible for executing instructions from the processor 754 to perform the operating and/or programming embodiments of the present disclosure. The control circuitry 774 can be a state machine, a sequencer, or some other type of controller. Additional circuitry and control signals can be provided, and, as stated above, the memory device detail of the embodiment of FIG. 7 has been reduced to facilitate ease of illustration.

Figure 8:
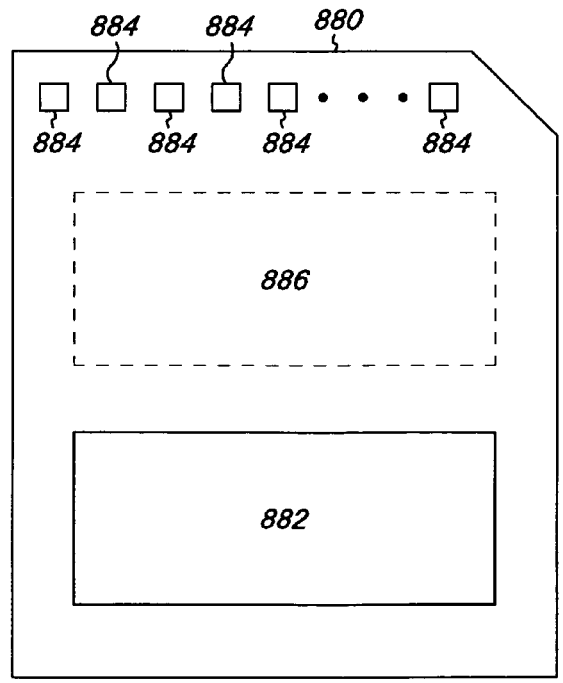
FIG. 8 is an illustration of a memory module utilizing at least one memory device incorporating a device in accordance with an embodiment of the present disclosure.

FIG. 8 is a functional block diagram of a memory module having at least one memory device incorporating a device in accordance with an embodiment of the present disclosure. Memory module 878 is illustrated as a memory card, although the concepts discussed with reference to memory module 878 are applicable to other types of portable or non-portable memory and are intended to be within the scope of "memory module" as used herein. In addition, although one example form factor is depicted in FIG. 8, these concepts are applicable to other form factors as well.

In the embodiments of FIG. 8, memory module 878 includes a housing 880 to enclose one or more memory devices 882. In some embodiments, the module may not have a housing 880.

A memory device 882 can include a device having a nanotube as a field emitter according to embodiments described herein. The housing 880 can include one or more contacts 884 for communication with a host device. Examples of host devices include digital cameras, digital recording and/or playback devices, PDAs, personal computers, memory card readers, interface hubs, and the like.

For some embodiments, the contacts 884 can be in the form of a standardized interface. For example, with a USB flash drive, the contacts 884 can be in the form of a USB Type-A male connector.

For some embodiments, the contacts 884 can be in the form of a semi-proprietary interface, such as those on Compact-Flash™ memory cards licensed by SanDisk Corporation, Memory Stick™ memory cards licensed by Sony Corporation, SD Secure Digital™ memory cards licensed by Toshiba Corporation, and the like. Contacts 884 provide an interface for passing control, address, and/or data signals between the memory module 884 and a host having compatible receptors for the contacts 884, and can have any suitable form and/or interface type.

The memory module 882 may also include additional circuitry 886, which may be one or more integrated circuits and/or discrete components. For some embodiments, the additional circuitry 886 may include, for example, a memory controller for controlling access across multiple memory devices 882 and/or for providing a translation layer between an external host and a memory device 882.

For example, there may not be a one-to-one correspondence between the number of contacts 884 and a number of connections to the one or more memory devices 882. Thus, a memory controller could selectively configure an I/O connection (not shown in FIG. 8) of a memory device 882 to receive the appropriate signal at the appropriate I/O connection at the appropriate time or to provide the appropriate signal at the appropriate contact 884 at the appropriate time.

Similarly, the communication protocol between a host and the memory module 878 may be different than what is used for access of a memory device 882. A memory controller could then translate the command sequences received from a host into the appropriate command sequences to achieve the desired access to the memory device 882. Such translation may further include changes in signal voltage levels in addition to command sequences, among other changes.

The additional circuitry 886 may further include functionality unrelated to control of a memory device 882 such as logic functions as might be performed by an ASIC. Additional circuitry 886 may include circuitry to limit read or write access to the memory module 878, such as password protection, biometrics, or the like.

The additional circuitry 886 may include circuitry to indicate a status of the memory module 878. For example, the additional circuitry 886 may include functionality to determine whether power is being supplied to the memory module 878 and whether the memory module 878 is currently being accessed, and/or to display an indication of its status, such as a solid light while powered and a flashing light while being accessed. The additional circuitry 886 may include passive devices, such as decoupling capacitors to help regulate power requirements within the memory module 878.

CONCLUSION

Field emission devices have been described herein utilizing a nanotube as a field emitter. The nanotube can be single-walled or multiwalled to form a nanoscale device, including field emission devices such as electron tubes, amplifiers, transistors, triodes, diodes, and switches.

Nanotube yarn can also be utilized. Devices of the present disclosure can include a housing with an interior space including an anode and a cathode.

In some embodiments, the housing is maintained in a vacuum state. In various embodiments, the housing can include a-control grid positioned between a nanotube and an anode inside the interior space of the housing or outside the housing. In some embodiments, the housing is maintained at an atmospheric pressure.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A field emission device, comprising:
    a housing defining an interior space including a lower portion and an upper portion, wherein the housing includes a dielectric shell covering an entire interior surface of the housing;
    a cathode positioned in the lower portion of the housing;
    only one elongate nanostructure electrically coupled to the cathode;
    an anode positioned in the upper portion of the housing, wherein the elongate nanostructure is elongate in a direction toward the anode; and
    a control grid positioned between the elongate nanostructure and the anode to control electron flow between the anode and the nanotube.

2. The field emission device of claim 1, where the elongate nanostructure is a carbon nanotube.

3. The field emission device of claim 1, where the elongate nanostructure is a carbon nanotube yarn.

4. The field emission device of claim 2, where multiple carbon nanotubes are coupled to the cathode.

5. The field emission device of claim 1, where the elongate nanostructure is a nanoneedle.

6. The field emission device of claim 1, where the elongate nanostructure is a nanorod.

7. The field emission device of claim 1, where the interior surface of the housing surrounds the elongate nanostructure.

8. The field emission device of claim 1, where the housing is maintained in a vacuum state.

9. The field emission device of claim 1, further including a second control grid positioned between the elongate nanostructure and the anode.

10. The field emission device of claim 1, where the cathode has a diameter of at least three hundred (300) millimeters (mm).

11. The field emission device of claim 1, where the cathode has a diameter in the range of approximately one (1) nanometer (nm) to ten (10) mm.

12. The field emission device of claim 11, where the housing is maintained at an atmospheric pressure.

13. An amplifier, comprising:
    a housing tube for providing a vacuum state, wherein the housing tube includes a dielectric shell covering an entire interior surface of the housing tube;
    only one elongate nanostructure positioned in a lower portion of the housing tube;
    an anode positioned in an upper portion of the housing tube for receiving electric current, wherein the elongate nanostructure is elongate in a direction toward the anode; and
    a control grid positioned between the elongate nanostructure and the anode.

14. The amplifier of claim 13, where the anode is positioned opposite the elongate nanostructure.

15. The amplifier of claim 13, where the elongate nanostructure is a carbon nanotube yarn.

16. The amplifier of claim 13, where the elongate nanostructure is a single-walled nanotube.

17. The amplifier of claim 13, where the elongate nanostructure is a multi-walled nanotube.

18. An electron tube, comprising:
    a dielectric shell covering an entire interior surface of the electron tube;
    only one single-walled nanotube positioned in the electron tube;
    a cathode coupled to the single-walled nanotube;
    an anode positioned opposite the single-walled nanotube in the electron tube, wherein the single-walled nanotube is elongate in a direction toward the anode; and
    a control grid positioned between the single-walled nanotube and the anode.

19. The electron tube of claim 18, where the single-walled nanotube has a diameter in a range of approximately 1.0 nanometer (nm) to 1.5 nm.

20. The electron tube of claim 18, where the single-walled nanotube has a configuration selected from the group including armchair, zig-zag, and chiral.

21. A triode, comprising:
    a housing defining an interior space, wherein the housing includes a dielectric shell covering an entire interior surface of the housing;

only one elongate nanostructure positioned in a lower portion of the interior space of the housing;

an anode positioned in an upper portion of the interior space of the housing, wherein the elongage nanostructure is elongate in a direction toward the anode; and a control grid positioned between the elongate nanostructure and the anode.

22. The triode of claim 21, where the interior surface of the housing surrounds the elongate nanostructure.

23. The triode of claim 21, where the elongate nanostructure is single-walled.

24. The triode of claim 21, where the elongate nanostructure is multi-walled.

25. The triode of claim 21, where the elongate nanostructure is a carbon nanotube yarn.

26. The triode of claim 21, where the elongate nanostructure is a nanoneedle.

27. The triode of claim 21, where the elongate nanostructure is a nanorod.

* * * * *

UNITED STATES PATENT AND TRADEMARK OFFICE
CERTIFICATE OF CORRECTION

PATENT NO. : 8,729,787 B2  
APPLICATION NO. : 11/640701  
DATED : May 20, 2014  
INVENTOR(S) : Neal R. Rueger Page 1 of 1

It is certified that error appears in the above-identified patent and that said Letters Patent is hereby corrected as shown below:

In the Claims

In column 14, line 24, in Claim 11, delete "mm." and insert -- nm. --, therefor.
In column 15, line 4, in Claim 21, delete "elongage" and insert -- elongate --, therefor.

Signed and Sealed this
Nineteenth Day of August, 2014

Michelle K. Lee
*Deputy Director of the United States Patent and Trademark Office*